United States Patent
Im (10) Patent No.: US 11,699,963 B2
(45) Date of Patent: Jul. 11, 2023

(54) POSITION SENSORLESS MOTOR CONTROL SYSTEM USING SINGLE CURRENT SENSOR AND MOTOR CONTROL METHOD OF THE SAME

(71) Applicant: HYUNDAI MOBIS CO., LTD., Seoul (KR)

(72) Inventor: Jun Hyuk Im, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 27 days.

(21) Appl. No.: 17/315,733

(22) Filed: May 10, 2021

(65) Prior Publication Data

US 2021/0359626 A1 Nov. 18, 2021

(30) Foreign Application Priority Data

May 11, 2020 (KR) .......... 10-2020-0056001

(51) Int. Cl.
*H02P 1/04* (2006.01)
*H02P 6/18* (2016.01)
*H02P 21/18* (2016.01)
*H02P 21/24* (2016.01)

(52) U.S. Cl.
CPC .............. *H02P 6/183* (2013.01); *H02P 21/18* (2016.02); *H02P 21/24* (2016.02); *H02P 2207/05* (2013.01)

(58) Field of Classification Search
CPC .......... H02P 21/18; H02P 6/183; H02P 21/24; H02P 2207/05

USPC ...................................... 318/400.33
See application file for complete search history.

(56) References Cited

U.S. PATENT DOCUMENTS

| | | | |
|---|---|---|---|
| 2002/0021105 A1* | 2/2002 | Na ................. | H02P 21/00 318/727 |
| 2006/0038531 A1* | 2/2006 | Wakabayashi ..... | H02P 29/50 318/807 |
| 2009/0102436 A1* | 4/2009 | Escobar Valderrama ........ | H02J 3/1857 323/207 |
| 2009/0322264 A1* | 12/2009 | Imura ............... | B60L 15/025 318/400.09 |
| 2010/0019702 A1* | 1/2010 | Jang ................ | G01R 19/0092 323/282 |
| 2010/0194319 A1* | 8/2010 | Ito .................. | H02P 6/183 318/400.13 |
| 2010/0277149 A1* | 11/2010 | Furutani ............ | H02M 1/0845 323/282 |
| 2011/0304290 A1* | 12/2011 | Ito .................. | H02P 6/185 318/400.32 |
| 2014/0247003 A1* | 9/2014 | Yamasaki .......... | H02P 21/05 318/802 |

(Continued)

*Primary Examiner* — Kawing Chan
*Assistant Examiner* — Gabriel Agared
(74) *Attorney, Agent, or Firm* — Morgan, Lewis & Bockius LLP (57) ABSTRACT

A motor control system includes a reference current generator that generates a reference current based on a command, a motor voltage providing device that generates a phase voltage based on the reference current, a high frequency voltage, and a feedback current and provides a motor with the phase voltage, and a high frequency voltage generator that generates the high frequency voltage corresponding to a magnitude of voltage generated based on the reference current and the feedback current.

11 Claims, 6 Drawing Sheets

(56) References Cited

U.S. PATENT DOCUMENTS

2019/0052211 A1* 2/2019 Nakai .................... H02P 27/08
2020/0195176 A1* 6/2020 Ho ......................... H02P 21/02

* cited by examiner

POSITION SENSORLESS MOTOR CONTROL SYSTEM USING SINGLE CURRENT SENSOR AND MOTOR CONTROL METHOD OF THE SAME

CROSS-REFERENCE TO RELATED APPLICATION

This application claims the benefit of priority to Korean Patent Application No. 10-2020-0056001, filed in the Korean Intellectual Property Office on May 11, 2020, the entire contents of which are incorporated herein by reference.

TECHNICAL FIELD

The present disclosure relates to a motor control system, and more particularly, relates to position sensorless control of a synchronous motor using a single current sensor.

BACKGROUND

To reduce the cost in a motor control system, technologies associated with position sensorless control in which a position sensor is removed and single current sensor control using only one current sensor have been actively developed.

One of the technologies associated with the position sensorless control is to estimate position information of a motor from a high frequency current induced by injecting a high frequency voltage signal into the motor. The technology associated with the single current sensor control is to change a pulse width modulation (PWM) switch pattern to detect a three-phase current from a DC-link current of the motor.

An existing position sensorless motor control system using a single current sensor, which is developed to optimize cost reduction, is applied without regard to a mutual influence on an existing position sensorless control technology and an existing single current sensor control technology not to show control performance to be satisfied enough to be commercialized.

For example, in the existing position sensorless motor control system using the single current sensor, when a final voltage command vector in which an output voltage command vector of a reference voltage generator using a current controller and a high frequency voltage vector are synchronized is located in an unmeasurable area of a space vector of an inverter, because the existing single current sensor control technology changes a PWM switch pattern to ensure a constant DC-link current, the above described high frequency voltage is not correctly injected. Thus, position sensorless control performance is degraded.

SUMMARY

The present disclosure has been made to solve the above-mentioned problems occurring in the prior art while advantages achieved by the prior art are maintained intact.

An aspect of the present disclosure provides stable control performance in a position sensorless motor control system using a single current sensor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a motor control system may include a reference current generator that generates a reference current based on a command, a motor voltage providing device that generates a phase voltage based on the reference current, a high frequency voltage, and a feedback current and provides a motor with the phase voltage, and a high frequency voltage generator that generates the high frequency voltage corresponding to a magnitude of voltage generated based on the reference current and the feedback current.

According to another aspect of the present disclosure, a motor control system may include a reference voltage generator that generates a reference voltage based on a reference current and a feedback current, a high frequency voltage generator that generates a high frequency voltage corresponding to a magnitude of the reference voltage, a first coordinate converter that injects the high frequency voltage into the reference voltage, and an inverter that generates a phase voltage based on an output of the first coordinate converter and provides a motor with the phase voltage.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 4.

Figure 1:
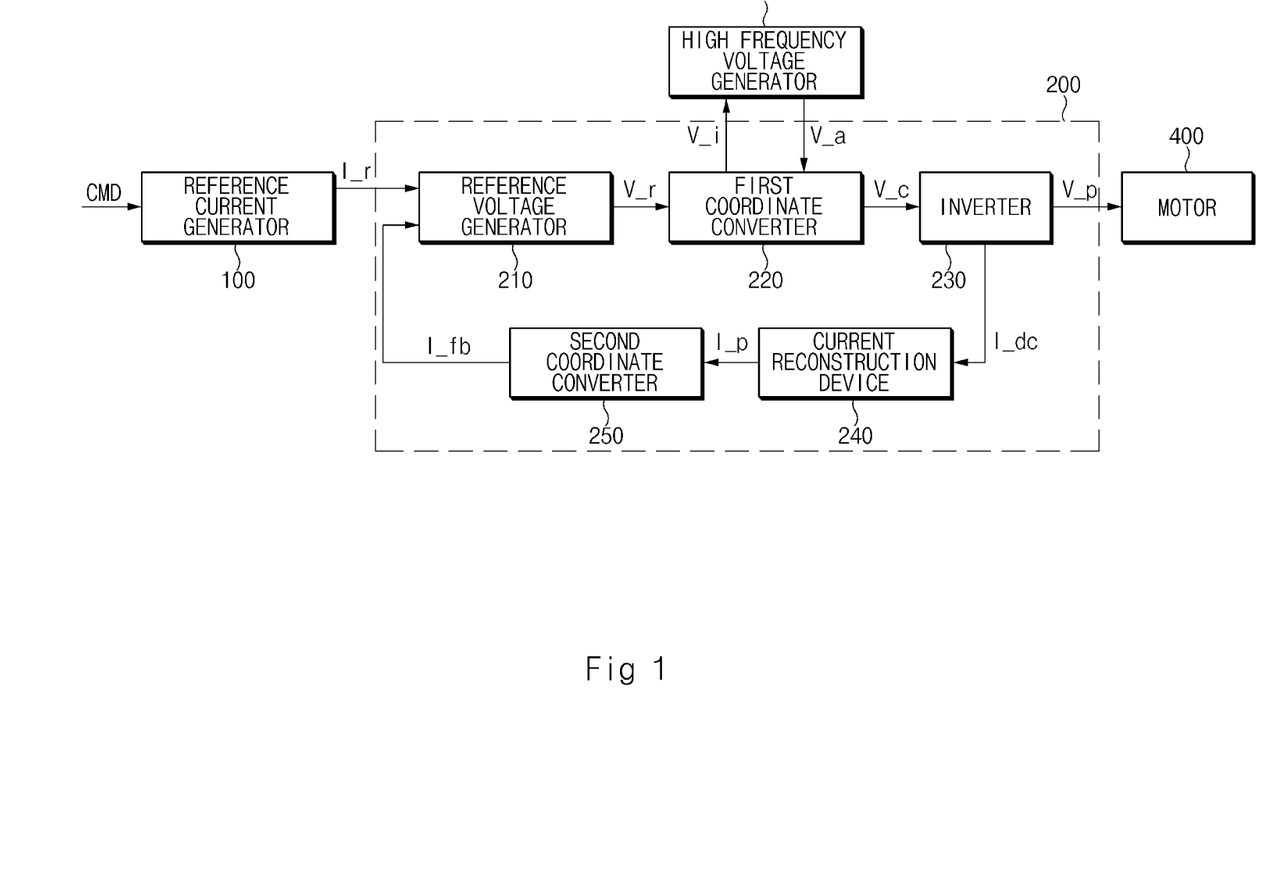
FIG. 1 is a block diagram illustrating a configuration of a motor control system according to an embodiment of the present disclosure.

FIG. 1 is a block diagram illustrating a configuration of a motor control system according to an embodiment of the present disclosure.

Referring to FIG. 1, the motor control system according to an embodiment of the present disclosure may be implemented in a vehicle. In this case, the motor control system of the vehicle may be integrally configured with control units in the vehicle or may be implemented as a separate device to be connected with the control units of the vehicle by a separate connection means.

Referring to FIG. 1, the motor control system according to an embodiment of the present disclosure may include a reference current generator 100, a motor voltage providing device 200, a high frequency voltage generator 300, and a motor 400.

The reference current generator 100 may generate and output a reference current $I\_r$ based on a command CMD. In this case, the reference current generator 100 may output the reference current $I\_r$ having the amount of current capable of generating a torque of the motor 400 corresponding to the command CMD.

The motor voltage providing device 200 may generate a phase voltage $V\_p$ based on the reference current $I\_r$ output from the reference current generator 100 and a high frequency voltage $V\_a$ output from the high frequency voltage generator 300 and may provide the motor 400 with the generated phase voltage $V\_p$.

For example, the motor voltage providing device 200 may generate a reference voltage $V\_r$ based on the reference current $I\_r$ and a feedback current $I\_fb$ and may generate the phase voltage $V\_p$ based on the reference voltage $V\_r$ and the high frequency voltage $V\_a$. In this case, the feedback current $I\_fb$ may have the amount of current corresponding to the amount of current consumed by the motor 400 and may refer to current generated based on a DC-link current $I\_dc$ which flows in an inverter 230 included in the motor voltage providing device 200.

The motor voltage providing device 200 may include a reference voltage generator 210, a first coordinate converter 220, the inverter 230, and a current reconstruction device 240, and a second coordinate converter 250.

The reference voltage generator 210 may generate the reference voltage $V\_r$ based on the reference current $I\_r$ and the feedback current $I\_fb$.

For example, the reference voltage generator 210 may generate the reference voltage $V\_r$ having a voltage level corresponding to in a difference in the amount of current between the reference current $I\_r$ and the feedback current $I\_fb$.

The first coordinate converter 220 may generate a conversion voltage $V\_c$ based on the reference voltage $V\_r$ and the high frequency voltage $V\_a$. In this case, the reference voltage $V\_r$ may be voltage, a level of which is controlled on the basis of a rotor reference coordinate system, the high frequency voltage $V\_a$ may be voltage, a level of which is controlled on the basis of a stator reference coordinate system, and the conversion voltage $V\_c$ may be voltage, a level of which is controlled on the basis of a three-phase coordinate system.

For example, the first coordinate converter 220 may convert the reference voltage $V\_r$ of the rotor reference coordinate system into the stator reference coordinate system and may inject the high frequency voltage $V\_a$ of the stator reference coordinate system into the reference voltage $V\_r$ converted into the stator reference coordinate system to generate the conversion voltage $V\_c$. In this case, the high frequency voltage $V\_a$ may have a voltage level corresponding to a magnitude of the reference voltage $V\_r$ converted into the stator reference coordinate system. In other words, the high frequency voltage $V\_a$ may be voltage proportional to the magnitude of the reference voltage $V\_r$ converted into the stator reference coordinate system.

The inverter 230 may receive the conversion voltage $V\_c$ to generate the phase voltage $V\_p$. In this case, the inverter 230 may be implemented with one DC-link capacitor and a plurality of switches. The phase voltage $V\_p$ may be generated by a switching operation of each switch. The phase voltage $V\_p$ may include voltages having three phases, each of which has a phase difference of 120 degrees. Current which flows in an upper end or a lower end of the DC-link capacitor making up the inverter 230 may be a DC-link current $I\_dc$.

The current reconstruction device 240 may generate a phase current $I\_p$ based on an effective voltage vector and the DC-link current $I\_dc$. In other words, the current reconstruction device 240 may generate the phase current $I\_p$ having a value corresponding to the amount of current of the DC-link current $I\_dc$. In this case, the phase current $I\_p$ may be current, a level of which is controlled on the basis of the three-phase coordinate system.

The second coordinate converter 250 may convert the phase current $I\_p$ into the feedback current $I\_fb$. In this case, the second coordinate converter 250 may convert the phase current $I\_p$ of the three-phase coordinate system into a current of the stator reference coordinate system and may convert the converted current of the stator reference coordinate system into a current of the rotor reference coordinate system to output the converted current as the feedback current $I\_fb$. Position information of a rotor of the motor 400 may be included in a current component making up the feedback current $I\_fb$, that is, a coordinate value of the rotor reference coordinate system.

The high frequency voltage generator 300 may generate the high frequency voltage $V\_a$ corresponding to a magnitude of a fundamental wave of the reference voltage $V\_r$ represented on the rotor reference coordinate system and may provide the first coordinate converter 220 with the generated high frequency voltage $V\_a$.

For example, the high frequency voltage generator 300 may receive the reference voltage $V\_i$ converted into the stator reference coordinate system by the first coordinate converter 220, may calculate a magnitude of the fundamental wave of the received reference voltage $V\_i$, and may generate the high frequency voltage $V\_a$ corresponding to the calculated magnitude of the fundamental wave. The high frequency voltage generator 300 may provide the first coordinate converter 220 with the generated high frequency voltage $V\_a$.

In this case, in the first coordinate converter 220 which converts the reference voltage $V\_r$ of the rotor reference coordinate system into a voltage of the stator reference coordinate system and converts the converted voltage of the stator reference coordinate system into the conversion voltage $V\_c$ of the three-phase coordinate system, voltage when the reference voltage $V\_r$ is converted into the voltage of the stator reference coordinate system may be referred to as an input voltage V_i. The high frequency voltage generator 300 may calculate a magnitude of the input voltage V_i and may generate the high frequency voltage V_a corresponding to the calculated value.

The motor 400 may receive the phase voltage V_p provided from the inverter 230 to rotate.

Figure 2:
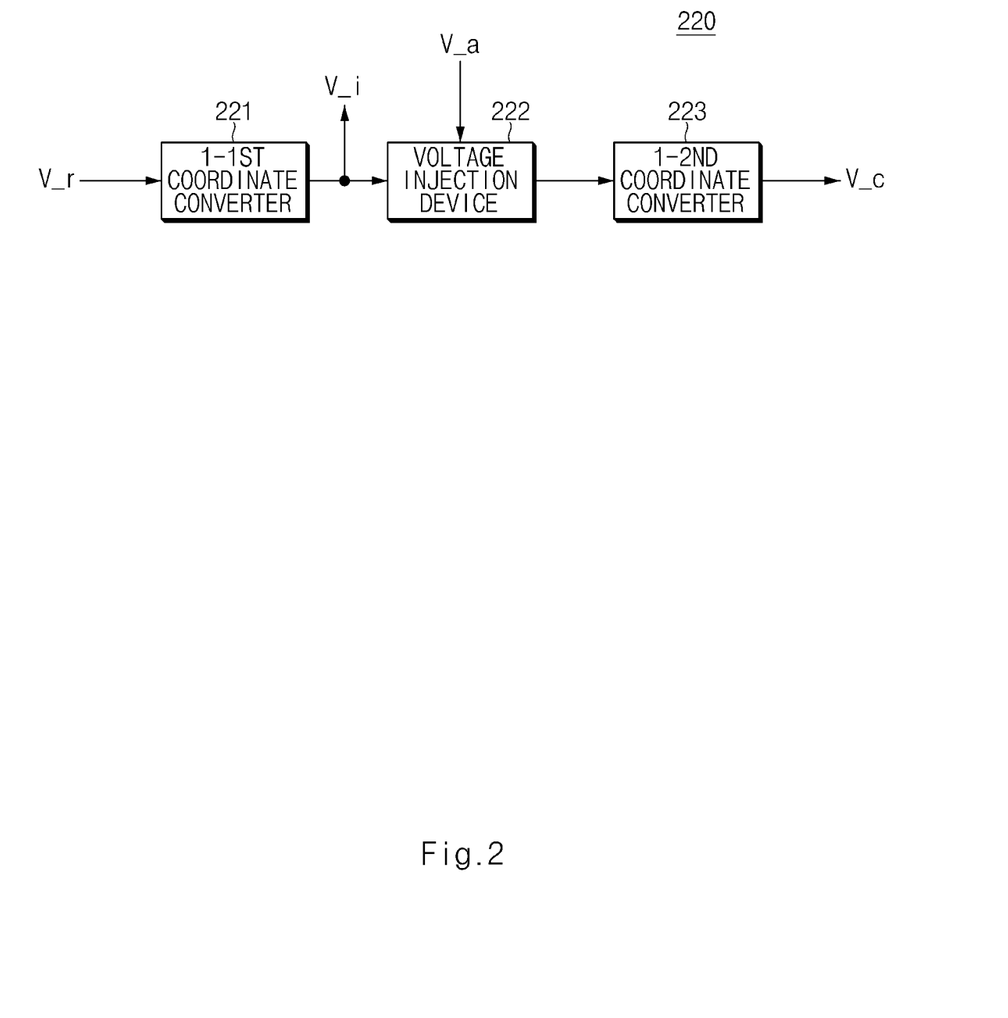
FIG. 2 is a block diagram illustrating a configuration of a first coordinate converter of a motor control system according to an embodiment of the present disclosure.

FIG. 2 is a block diagram illustrating a configuration of a first coordinate converter of a motor control system according to an embodiment of the present disclosure.

Referring to FIG. 2, a first coordinate converter 220 may include a 1-1st coordinate converter 221, a voltage injection device 222, and a 1-2nd coordinate converter 223.

The 1-1st coordinate converter 221 may convert a reference voltage V_r according to a rotor reference coordinate system provided from a reference voltage generator 210 of FIG. 1 into voltage according to a stator reference coordinate system. In this case, the voltage converted by the 1-1st coordinate converter 221 may be provided as an input voltage V_i to a high frequency voltage generator 300 of FIG. 1.

The voltage injection device 222 may inject a high frequency voltage V_a generated by the high frequency voltage generator 300 into the voltage converted by the 1-1st coordinate converter 221.

The 1-2nd coordinate converter 223 may convert the voltage of the stator reference coordinate system, into which the high frequency voltage V_a is injected, into a conversion voltage V_c according to a three-phase coordinate system.

In this case, the reason why the first coordinate converter 220 converts the rotor reference coordinate system into the stator reference coordinate system and then converts the stator reference coordinate system into the three-phase coordinate system without immediately converting the rotor reference coordinate system into the three-phase coordinate system is because voltage control on the stator reference coordinate system is easier than those on the other coordinate systems. In other words, because calculating a magnitude of the reference voltage V_r converted into the stator reference coordinate system is easier than calculating a magnitude of a reference voltage converted into another coordinate system, it is easy to control a magnitude and level of the high frequency voltage V_a.

To sum up, the reason why the voltage injection device 222 in the first coordinate converter 220 operates on an area of the stator reference coordinate system is because calculating a magnitude of the high frequency voltage V_a is easier than calculating the magnitude of the high frequency voltage V_a on the other coordinate systems such that the conversion voltage V_c is always on a measurable area. In other words, it is easy to control the high frequency voltage V_a on the stator reference coordinate system.

Figure 3:
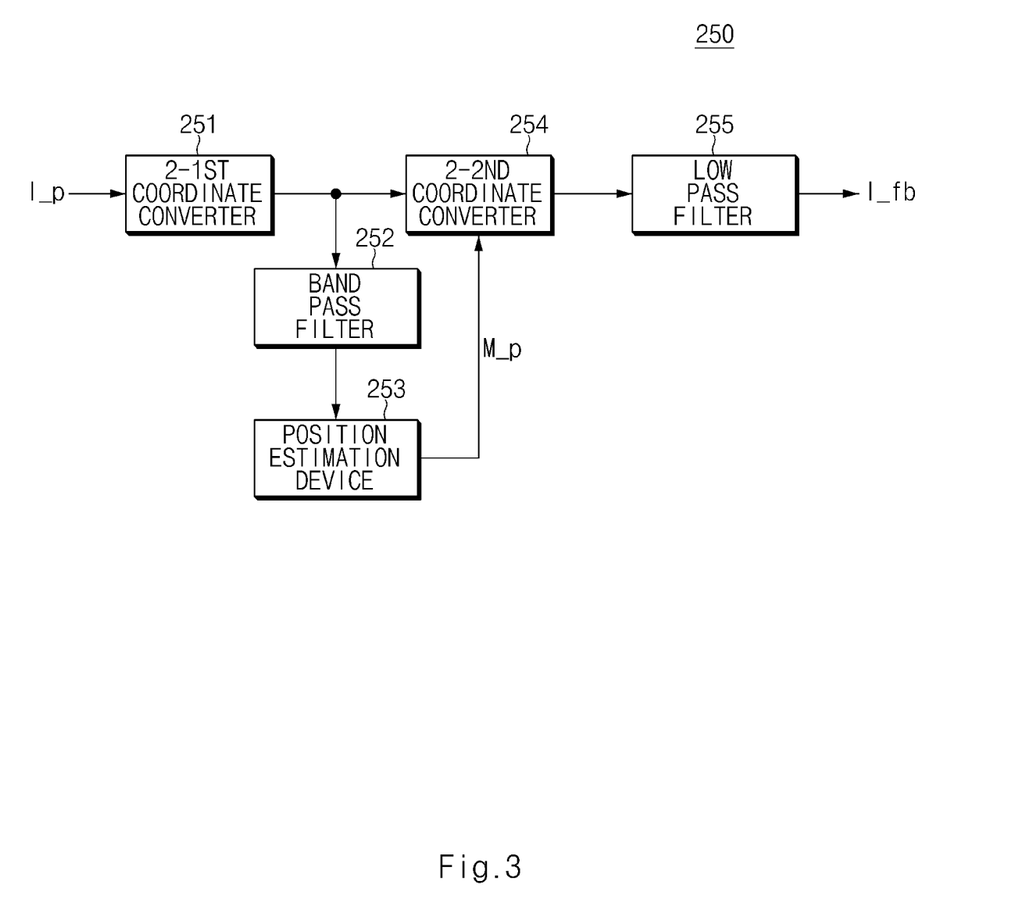
FIG. 3 is a block diagram illustrating a configuration of a second coordinate converter of a motor control system according to an embodiment of the present disclosure.

FIG. 3 is a block diagram illustrating a configuration of a second coordinate converter of a motor control system according to an embodiment of the present disclosure.

Referring to FIG. 3, a second coordinate converter 250 may include a 2-1st coordinate converter 251, a band pass filter 252, a position estimation device 253, a 2-2nd coordinate converter 254, and a low pass filter 255.

The 2-1st coordinate converter 251 may convert a phase current I_p into current according to a stator reference coordinate system. In this case, the 2-1st coordinate converter 251 may receive the phase current I_p according to a three-phase coordinate system from a current reconstruction device 240 of FIG. 1.

The band pass filter 252 may be a filter which passes only a predetermined frequency component, which may pass only a high frequency component among current components output from the 2-1st coordinate converter 251 to provide the position estimation device 253 with the high frequency component. In this case, the band pass filter 252 may be implemented as a high frequency pass filter.

The position estimation device 253 may estimate a position of a rotor of a motor 400 of FIG. 1 based on the high frequency component provided from the band pass filter 252 and may output the estimated result as position information M_p. In this case, the position information M_p may include angle information about the position of the rotor of the motor 400.

The 2-2nd coordinate converter 254 may convert current according to a stator reference coordinate system, which is converted by the 2-1st coordinate converter 251, into current according to a rotor reference coordinate system. In this case, the 2-2nd coordinate converter 254 may convert the current according to the rotor reference coordinate system into a direct current (DC) component based on the position information M_p.

In other words, the 2-2nd coordinate converter 254 may convert the current according to the stator reference coordinate system, which is converted by the 2-1st coordinate converter 251, into current including a DC component represented on the rotor reference coordinate system.

The low pass filter 255 may output only a low frequency component of the current output from the 2-2nd coordinate converter 254 as feedback current I_fb.

Figure 4:
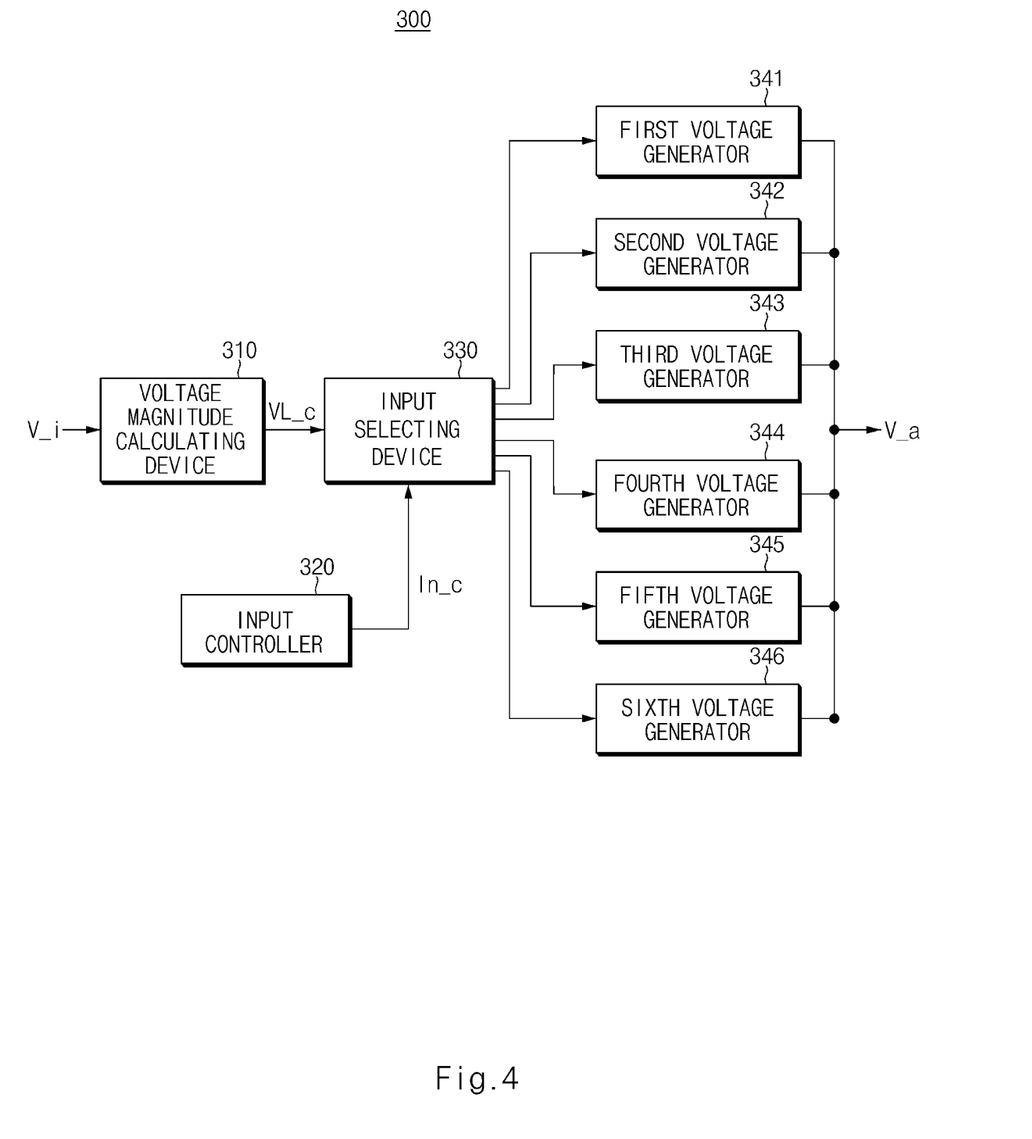
FIG. 4 is a block diagram illustrating a configuration of a high frequency voltage generator of a motor control system according to an embodiment of the present disclosure.

FIG. 4 is a block diagram illustrating a configuration of a high frequency voltage generator of a motor control system according to an embodiment of the present disclosure.

As shown in FIG. 4, a high frequency voltage generator 300 may include a voltage magnitude calculating device 310, an input controller 320, an input selecting device 330, and a plurality of voltage generators 341 to 346. The plurality of voltage generators according to an embodiment of the present disclosure are disclosed as the first to sixth voltage generators 341 to 346, but the number of voltage generators is not limited thereto.

The voltage magnitude calculating device 310 may be a component which calculates a magnitude of an input voltage V_i provided from a first coordinate converter 220 of FIG. 1, which, in detail, may calculate an absolute magnitude of the input voltage V_i.

For example, the voltage magnitude calculating device 310 may calculate a magnitude of the input voltage V_i according to a stator reference coordinate system, that is, the input voltage V_i represented as coordinates for two axes by the following formula.

When coordinates according to the stator reference coordinate system of the input voltage V_i are (a, b), the voltage magnitude calculating device 310 may calculate a value of $\sqrt{a^2 b^2}$ to calculate a magnitude of the input voltage V_i and may output the result as calculation voltage information VL_c.

The input controller 320 may generate an input control code In_c based on a sampling period of the motor control system according to an embodiment of the present disclosure. In this case, the input control code In_c may include a plurality of bits, and the input controller 320 may include a counter.

For example, the input controller 320 may increase a code value of the input control code In_c per sampling period and may return the code value of the input control code In_c to a code value of a predetermined minimum value again, when the code value of the input control code In_c arrives at a predetermined maximum value.

A description will be given in detail below.

It is assumed that the input control code In_c may be preset to a maximum value of 6 and may be preset to a minimum value of 1 and that the code value of the input control code In_c may be increased by 1 per sampling period.

The input controller 320 may increase a code value of the input control code In_c from 1 to 6 per sampling period and may return the code value of the input control code In_c to the minimum value of 1 at a next sampling period, when the code value of the input control code In_c arrives at the maximum value of 6.

The input selecting device 330 may input the calculation voltage information VL_c to a voltage generator corresponding to the code value of the input control code In_c among the first to sixth voltage generators 341 to 346.

For example, when the code value of the input control code In_c is 1, the input selecting device 330 may select the first voltage generator 341 among the first to sixth voltage generators 341 to 346 and may output the calculation voltage information VL_c to the selected first voltage generator 341.

When the code value of the input control code In_c is 2, the input selecting device 330 may select the second voltage generator 342 among the first to sixth voltage generators 341 to 346 and may output the calculation voltage information VL_c to the selected second voltage generator 342.

When the code value of the input control code In_c is 3, the input selecting device 330 may select the third voltage generator 343 among the first to sixth voltage generators 341 to 346 and may output the calculation voltage information VL_c to the selected third voltage generator 343.

When the code value of the input control code In_c is 4, the input selecting device 330 may select the fourth voltage generator 344 among the first to sixth voltage generators 341 to 346 and may output the calculation voltage information VL_c to the selected fourth voltage generator 344.

When the code value of the input control code In_c is 5, the input selecting device 330 may select the fifth voltage generator 345 among the first to sixth voltage generators 341 to 346 and may output the calculation voltage information VL_c to the selected fifth voltage generator 345.

When the code value of the input control code In_c is 6, the input selecting device 330 may select the sixth voltage generator 346 among the first to sixth voltage generators 341 to 346 and may output the calculation voltage information VL_c to the selected sixth voltage generator 346.

Each of the first to sixth voltage generators 341 to 346 may generate a high frequency voltage V_a having a level corresponding to the input calculation voltage information VL_c.

For example, each of the first to sixth voltage generators 341 to 346 may generate the high frequency voltage V_a depending on a predetermined formula which has the calculation voltage information VL_c as an input. In this case, because the high frequency voltage V_a is voltage according to the stator reference coordinate system, it may be represented as two axis coordinates. In other words, the high frequency voltage V_a may be represented as a first axis coordinate value and a second axis coordinate value.

Each of the first to sixth voltage generators 341 to 346 may represent each of the first and second axis coordinate values of the high frequency voltage V_a as A*(magnitude of VL_c)+B*C. In this case, A, B, and C values may be predetermined constants, A and B may vary in value with each voltage generator, and C may be applied as the same value to all voltage generators.

When the first axis coordinate value and the second axis coordinate value of the high frequency voltage V_a generated by each of the first to sixth voltage generators 341 to 346 are disclosed, they may be represented as the following table.

TABLE 1

| | First axis coordinate value | Second axis coordinate value |
|---|---|---|
| First voltage generator | $\sqrt{3} * (\text{magnitude of VL\_c}) + \frac{3}{2} * \text{Constant}$ | $(\text{magnitude of VL\_c}) + \frac{\sqrt{3}}{2} * \text{Constant}$ |
| Second voltage generator | 0 | $2 * (\text{magnitude of VL\_c}) + \sqrt{3} * \text{Constant}$ |
| Third voltage generator | $-\left(\sqrt{3} * (\text{magnitude of VL\_c}) + \frac{3}{2} * \text{Constant}\right)$ | $(\text{magnitude of VL\_c}) + \frac{\sqrt{3}}{2} * \text{Constant}$ |
| Fourth voltage generator | $-\left(\sqrt{3} * (\text{magnitude of VL\_c}) + \frac{3}{2} * \text{Constant}\right)$ | $-\left\{(\text{magnitude of VL\_c}) + \frac{\sqrt{3}}{2} * \text{Constant}\right\}$ |
| Fifth voltage generator | 0 | $-\{2 * (\text{magnitude of VL\_c}) + \sqrt{3} * \text{Constant}\}$ |
| Sixth voltage generator | $\sqrt{3} * (\text{magnitude of VL\_c}) + \frac{3}{2} * \text{Constant}$ | $-\left\{(\text{magnitude of VL\_c}) + \frac{\sqrt{3}}{2} * \text{Constant}\right\}$ |

All the constants in Table 1 above may be the same value. In the first voltage generator 341, constant A of the first axis coordinate value may be $\sqrt{3}$ and constant B of the first axis coordinate value may be 3/2, and constant A of the second axis coordinate value may be 1 and constant B of the second axis coordinate value may be $$\frac{\sqrt{3}}{2}.$$

In the second voltage generator 342, constants A and B of the first axis coordinate value may be 0, and constant A of the second axis coordinate value may be 2 and constant B of the second axis coordinate value may be.

In the third voltage generator 343, constant A of the first axis coordinate value may be $-\sqrt{3}$ and constant B of the first axis coordinate value may be $-3/2$, and constant A of the second axis coordinate value may be 1 and constant B of the second axis coordinate value may be $$\frac{\sqrt{3}}{2}.$$

In the fourth voltage generator 344, constant A of the first axis coordinate value may be $-\sqrt{3}$ and constant B of the first axis coordinate value may be $-3/2$, and constant A of the second axis coordinate value may be $-1$ and constant B of the second axis coordinate value may be $$\frac{\sqrt{3}}{-2}.$$

In the fifth voltage generator 345, constants A and B of the first axis coordinate value may be 0, and constant A of the second axis coordinate value may be $-2$ and constant B of the second axis coordinate value may be $-\sqrt{3}$.

In the sixth voltage generator 346, constant A of the first axis coordinate value may be $\sqrt{3}$ and constant B of the first axis coordinate value may be $3/2$, and constant A of the second axis coordinate value may be $-1$ and constant B of the second axis coordinate value may be $$-\frac{\sqrt{3}}{2}.$$

The high frequency voltage generator 300 of the motor control system according to an embodiment of the present disclosure may generate the high frequency voltage V_a which is proportional to a magnitude of the reference voltage V_r, a level of which is determined according to a command, and has a frequency of ⅙ of a PWM switching frequency. The motor control system according to an embodiment of the present disclosure may provide an inverter 230 of FIG. 1 with a phase voltage V_p generated by injecting the high frequency voltage V_a into a reference voltage V_r, thus providing a motor 400 of FIG. 1 with the high frequency voltage V_a.

A description will be given of an operation of the above constructed motor control system according to an embodiment of the present disclosure.

A command CMD may be provided to a reference current generator 100 of the motor control system from an upper controller of a vehicle.

The reference current generator 100 may generate a reference current I_r having a current value for generating a torque of a motor 400 corresponding to the command CMD.

A motor voltage providing device 200 may generate a phase voltage V_p based on the reference current I_r, a high frequency voltage V_a, and a feedback current I_fb and may provide the motor 400 with the generated phase voltage V_p, thus running the motor 400.

A description will be given in detail of an operation of the motor voltage providing device 200.

The reference voltage generator 210 may generate a reference voltage V_r corresponding to a difference in the amount of current between the reference current I_r and the feedback current I_fb.

A first coordinate converter 220 may inject a high frequency voltage V_a into the reference voltage V_r to generate a conversion voltage V_c. In this case, the high frequency voltage V_a may be provided from a high frequency voltage generator 300, and the high frequency voltage V_a may correspond to an absolute magnitude of the reference voltage V_r.

An inverter 230 may generate the phase voltage V_p based on the conversion voltage V_c.

A current reconstruction device 240 may receive a DC-link current I_dc of the inverter 230 and may generate the phase current I_p based on the DC-link current I_dc.

A second coordinate converter 250 may generate the feedback current I_fb based on the phase current I_p. In this case, the second coordinate converter 250 may extract a high frequency component included in the phase current I_p to calculate position information M_p of a rotor of the motor 400 and may generate the feedback current I_fb based on the position information M_p of the rotor and the phase current I_p. Thus, the position information M_p of the rotor of the motor 400 may be included in the feedback current I_fb output from the second coordinate converter 250.

As described above, the motor control system according to an embodiment of the present disclosure may generate the three-phase phase current I_p from the DC-link current I_dc of the inverter 230 by using only one current sensor, may estimate the position information M_p of the rotor of the motor 400 from the phase current I_p without a sensor which senses a position of the rotor of the motor 400, and may use the position information M_p of the rotor of the motor 400 for control of the motor 400.

Furthermore, because of generating the high frequency voltage V_a proportional to the magnitude of the reference voltage V_r according to the command CMD to ensure a certain amount of DC-link current I_dc for measuring the accurate phase current I_p of the motor 400 and providing the inverter 230 with the generated high frequency voltage V_a, the motor control system according to an embodiment of the present disclosure may always estimate a position of the rotor of the motor 400.

The motor control system according to an embodiment of the present disclosure may use only one current sensor and may always estimate the position of the rotor of the motor 400 without a motor rotor sensor, thus saving the cost of the motor control system and enhancing motor control efficiency.

Figure 5:
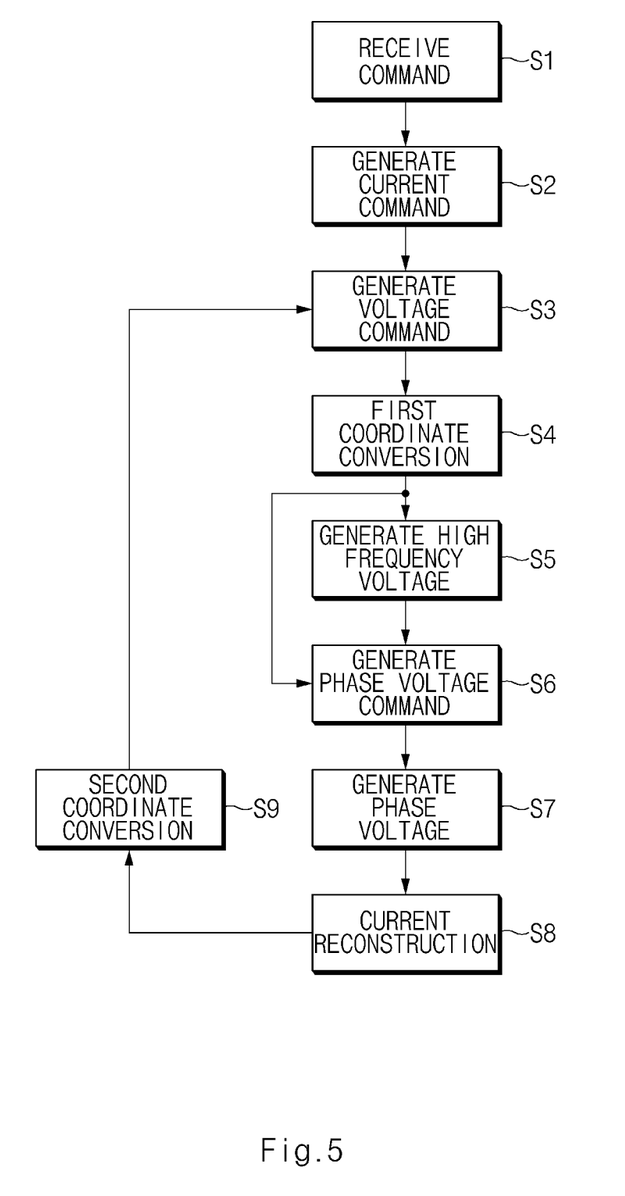
FIG. 5 is a flowchart illustrating a motor control method according to another embodiment of the present disclosure.

FIG. 5 is a flowchart illustrating a position sensorless motor control method using a single current sensor according to another embodiment of the present disclosure.

Referring to FIG. 5, the position sensorless motor control method using the single current sensor according to another embodiment of the present disclosure may include receiving (S1) a command, generating (S2) a current command, generating (S3) a voltage command, performing (S4) first coordinate conversion, generating (S5) a high frequency voltage, generating (S6) a phase voltage command, generating (S7) a phase voltage, performing (S8) current reconstruction, and performing (S9) second coordinate conversion.

S1 may be receiving a command CMD provided from the outside or inside of a motor control system using a single current sensor according to an embodiment of the present disclosure. In this case, the command CMD may be a command about running of a motor 400 of FIG. 1.

S2 may include generating a current command vector I_r capable of generating a torque of the motor 400 corresponding to the command CMD received in S1.

S2 may be a function performed in a reference current generator 100 of FIG. 1.

S3 may be to generate a voltage command vector V_r based on the current command vector I_r and a feedback current vector I-fb.

For example, S3 may be to generate the voltage command vector V_r having the amount of vector corresponding to a difference between the current command vector I_r and the feedback current vector I-fb. In this case, S3 may be a function performed in a reference voltage generator 210 of FIG. 1.

S4 may be to convert the voltage command vector V_r according to a rotor reference coordinate system into a voltage vector according to a stator reference coordinate system.

For example, S4 may be a function performed in a first coordinate converter 220 of FIG. 1.

S5 may be to generate a high frequency voltage vector V_a having a magnitude corresponding to a magnitude of the voltage vector V_i according to the stator reference coordinate system converted in S4. The reason why the high frequency voltage vector V_a is generated as the vector according to the stator reference coordinate system in S5 is because calculating the high frequency voltage vector V_a in the stator reference coordinate system is easier than those in other coordinate systems.

For example, S5 may be a function performed in a high frequency voltage generator 300 of FIG. 1.

S6 may be to synthesize the voltage vector according to the stator reference coordinate system converted in S4 with the high frequency voltage vector V_a generated in S5 and convert the synthesized voltage vector into a phase voltage command vector V_c according to a three-phase coordinate system.

For example, S6 may be a function performed in a voltage injection device 222 and a 1-2nd coordinate converter 223 of FIG. 2.

S7 may be to generate a phase voltage V_p based on the phase voltage command vector V_c generated in S6. In this case, the phase voltage V_p may be voltage provided to the motor 400 of FIG. 1.

For example, S7 may be a function performed in an inverter 230 of FIG. 1.

S8 may be to generate a phase current I_p based on a DC-link current I_dc of the inverter 230 and an effective voltage vector. In this case, the phase current I_p may be a current vector according to the three-phase coordinate system.

For example, S8 may be a function performed in a current reconstruction device 240 of FIG. 1.

S9 may be to convert the phase current I_p according to the three-phase coordinate system generated in S8 into a current vector according to the stator reference coordinate system and convert the converted current vector of the stator reference coordinate system into a current vector according to the rotor reference coordinate system to output the converted current vector as a feedback current vector I_fb.

For example, S9 may be a function performed in a second coordinate converter 250 of FIG. 1.

As shown in FIG. 5, the position sensorless motor control method using the single current sensor may be to generate the voltage command vector V_r having the magnitude corresponding to the command CMD, generate the high frequency voltage vector V_a corresponding to the magnitude of the voltage command vector V_r, and provide the inverter 230 with the phase voltage command V_c in which the high frequency voltage vector V_a and the voltage command vector V_r are synthesized, thus running the motor 400. In addition, the position sensorless motor control method using the single current sensor may be to construct the three-phase phase current I_p from the DC-link current I_dc of the inverter 230, generate the feedback current vector I-fb based on the phase current I_p, and use the generated feedback current vector I_fb to generate the voltage command V_r.

As such, the position sensorless motor control method according to an embodiment of the present disclosure may be to generate the high frequency voltage vector V_a proportional to the magnitude of the voltage command vector V_r and provide the inverter 230 with the generated high frequency voltage vector V_a to measure an accurate phase current I_p, thus always tracking the position of the rotor of the motor 400.

The present technology may save manufacturing cost by using only one current sensor rather than a position sensor for detecting a position of the rotor of the motor and three current sensors for detecting a phase current of the motor.

Furthermore, the present technology may remove a change algorithm of a PWM switch pattern from an existing single current sensor control technology, as a final voltage command vector of the motor control system is always located in a measurable area, thus reducing the amount of control calculation.

Figure 6:
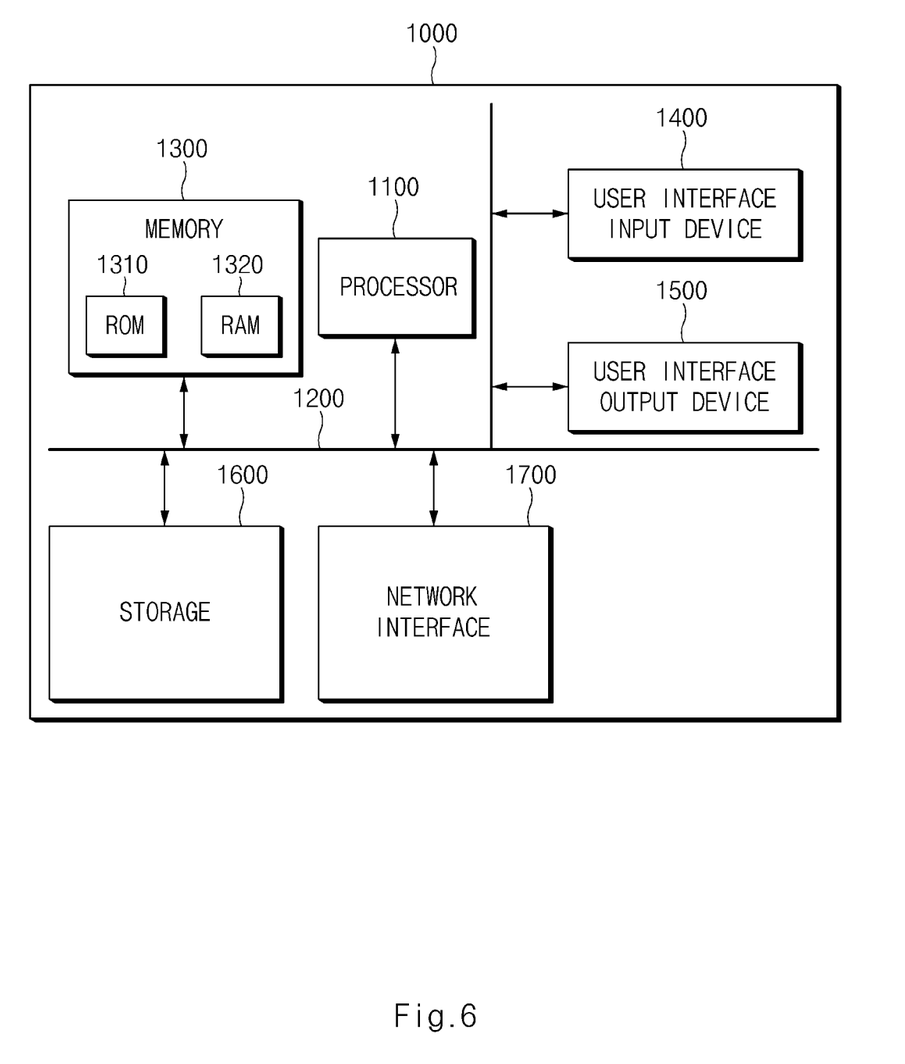
FIG. 6 is a block diagram illustrating a computing system for executing a motor control method according to an embodiment of the present disclosure.

FIG. 6 is a block diagram illustrating a computing system for executing a motor control method according to an embodiment of the present disclosure.

Referring to FIG. 6, the computing system 1000 may include at least one processor 1100, a memory 1300, a user interface input device 1400, a user interface output device 1500, storage 1600, and a network interface 1700, which are connected with each other via a bus 1200.

The processor 1100 may be a Central Processing Unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an Application Specific Integrated Circuit (ASIC). The ASIC may reside within a user terminal. In another case, the processor 1100 and the storage medium may reside in the user terminal as separate components.

Furthermore, the present technology may inject a stable high frequency voltage signal, because the PWM switch pattern is not changed, thus implementing stable position sensorless control performance. In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A motor control system, comprising:
a reference current generator configured to generate a reference current based on a command;
a high frequency voltage generator configured to generate a high frequency voltage corresponding to a reference voltage generated based on the reference current and a feedback current corresponding to an amount of current consumed by a motor; and
a motor voltage providing device configured to generate a phase voltage based on the reference current, the high frequency voltage, and the feedback current and to provide the motor with the phase voltage,
wherein the motor voltage providing device is further configured to:
generate a first reference voltage of a rotor reference coordinate system based on the feedback current and the reference current;
convert the first reference voltage of the rotor reference coordinate system into a second reference voltage of a stator reference coordinate system, and provides the converted second reference voltage, as an input voltage, to the high frequency voltage generator to generate the high frequency voltage corresponding to the second reference voltage; and
inject the high frequency voltage into the second reference voltage of the stator reference coordinate system.

2. The motor control system of claim 1, wherein the motor voltage providing device includes:
a reference voltage generator configured to generate the reference voltage based on the reference current and the feedback current;
a first coordinate converter configured to inject the high frequency voltage into the reference voltage to generate a conversion voltage;
an inverter configured to generate the phase voltage based on the conversion voltage;
a current reconstruction device configured to generate a phase current based on a DC-link current of the inverter; and
a second coordinate converter configured to generate the feedback current based on the phase current.

3. The motor control system of claim 2, wherein the reference voltage generator generates the reference voltage having a voltage level corresponding to a difference in the amount of current between the reference current and the feedback current.

4. The motor control system of claim 2, wherein the first coordinate converter includes:
a 1-1st coordinate converter configured to convert the first reference voltage of the rotor reference coordinate system into the second reference voltage of the stator reference coordinate system;
a voltage injection device configured to inject the high frequency voltage into an output voltage of the 1-1st coordinate converter; and
a 1-2nd coordinate converter configured to convert the second reference voltage of the stator reference coordinate system, into which the high frequency voltage is injected, into the conversion voltage of a three-phase coordinate system, and
wherein the output voltage of the 1-1st coordinate converter is provided as an input voltage to the high frequency voltage generator.

5. The motor control system of claim 4, wherein the high frequency voltage generator includes:
a plurality of voltage generators;
a voltage magnitude calculating device configured to calculate a magnitude of the input voltage;
an input controller configured to increase a code value of an input control code per sensing period; and
an input selecting device configured to select one voltage generator corresponding to a code value of the input control code among the plurality of voltage generators and to input an output of the voltage magnitude calculating device to the selected voltage generator.

6. The motor control system of claim 2, wherein the second coordinate converter includes:
a 2-1st coordinate converter configured to convert the phase current of a three-phase coordinate system into a current of the stator reference coordinate system;
a band pass filter configured to pass only a high frequency component in an output current of the 2-1st coordinate converter;
a position estimation device configured to estimate position information of a rotor of the motor based on an output of the band pass filter;
a 2-2nd coordinate converter configured to convert the output current of the 2-1st coordinate converter into a current of the rotor reference coordinate system based on the position information of the rotor; and
a low pass filter configured to output only a low frequency component in an output current of the 2-2nd coordinate converter as the feedback current.

7. A motor control system, comprising:
a reference voltage generator configured to generate a reference voltage based on a reference current and a feedback current corresponding to amount of current consumed by a motor;
a high frequency voltage generator configured to generate a high frequency voltage corresponding to the reference voltage;
a first coordinate converter configured to inject the high frequency voltage into the reference voltage; and
an inverter configured to generate a phase voltage based on an output of the first coordinate converter and to provide a motor with the phase voltage,
wherein the first coordinate converter converts a first reference voltage of a rotor reference coordinate system into a second reference voltage of a stator reference coordinate system, and the second reference voltage converted by the first coordinate converter is provided, as an input voltage, to the high frequency voltage generator to generate the high frequency voltage corresponding to the second reference voltage, and wherein the first coordinate converter injects the high frequency voltage into the second reference voltage of the stator reference coordinate system.

8. The motor control system of claim 7, further comprising:
   a current reconstruction device configured to generate a phase current based on a DC-link current of the inverter; and
   a second coordinate converter configured to generate the feedback current based on the phase current.

9. The motor control system of claim 7, wherein the high frequency voltage generator includes:
   a plurality of voltage generators;
   a voltage magnitude calculating device configured to calculate a magnitude of the reference voltage;
   an input controller configured to increase a code value of an input control code based on a sensing period; and
   an input selecting device configured to select one voltage generator corresponding to a code value of the input control code among the plurality of voltage generators and to input an output of the voltage magnitude calculating device to the selected voltage generator.

10. The motor control system of claim 9, wherein each of the plurality of voltage generators generates the high frequency voltage having a magnitude proportional to a result output from the voltage magnitude calculating device.

11. A motor control method, comprising:
   generating a current command vector for generating a torque of a motor corresponding to a command;
   generating a voltage command vector according to a rotor reference coordinate system based on the current command vector and a feedback current vector;
   converting the voltage command vector into a first voltage vector according to a stator reference coordinate system;
   generating a high frequency voltage vector having a magnitude corresponding to a magnitude of the first voltage vector;
   synthesizing the first voltage vector with the high frequency voltage vector to generate a second voltage vector and converting the second voltage vector into a phase voltage command vector according to a three-phase coordinate system;
   generating a phase voltage based on the phase voltage command vector and providing the motor with the phase voltage;
   generating a phase current according to the three-phase coordinate system based on a DC-link current of an inverter which provides the phase voltage; and
   converting the phase current according to the three-phase coordinate system into the feedback current vector according to the rotor reference coordinate system.

\* \* \* \* \*